United States Patent [19]

Abe et al.

[11] 4,247,246

[45] Jan. 27, 1981

[54] VORTEX BLOWER

[75] Inventors: Masahiro Abe, Chiba; Katsuo Motosaka, Narashino; Toshiaki Sumi, Narita, all of Japan

[73] Assignee: Hitachi, Ltd., Japan

[21] Appl. No.: 12,030

[22] Filed: Feb. 14, 1979

[30] Foreign Application Priority Data

Feb. 15, 1978 [JP] Japan .................................. 53-15406

[51] Int. Cl.³ .............................................. F04D 5/00
[52] U.S. Cl. ............................... 415/53 T; 308/189 R; 415/213 T
[58] Field of Search ........................ 415/53 T, 56–58, 415/213 T; 208/72–77, 187, 189 R, DIG. 1; 417/368; 188/90

[56] References Cited

U.S. PATENT DOCUMENTS

| | | | |
|---|---|---|---|
| 3,547,231 | 12/1970 | Braun | 188/90 |
| 3,694,101 | 9/1972 | Rumsey | 415/213 T |
| 3,849,024 | 11/1974 | Masai et al. | 415/53 T |
| 3,936,240 | 2/1976 | Dochterman | 417/368 |
| 4,194,798 | 3/1980 | Schönwald et al. | 308/189 R |

Primary Examiner—Leonard D. Christian
Attorney, Agent, or Firm—Craig & Antonelli

[57] ABSTRACT

A vortex blower comprises a motor and an impeller directly connected to one end of a motor shaft and housed in an impeller housing. A part of the impeller housing is made of aluminium or aluminium-based alloy and includes an integral portion which serves as that end wall of the motor which is adjacent to the impeller. The end wall is provided with a radially extending first thrust surface for engagement with one end face of an outer race of a bearing which journals the motor shaft. A bearing retainer of a metal having a wear-resistant property higher than those of aluminium and the aluminium-based alloy is provided with an axially extending cylindrical surface for engagement with the outer peripheral surface of the outer bearing race and a radially extending second thrust surface for engagement with the other end face of the outer bearing race. The bearing retainer is mounted on the end wall so that the outer peripheral surface and end faces of the outer bearing race are engaged with the cylindrical surface of the bearing retainer and the first and second thrust surfaces, respectively. The use of the bearing retainer fabricated separately of the end wall and mounted thereon eliminates the use of an insert which was required in the prior art and thus simplifies the steps of manufacture and reduces the number of necessary machine parts.

4 Claims, 2 Drawing Figures

VORTEX BLOWER

BACKGROUND OF THE INVENTION

The present invention relates generally to an improvement in a vortex blower comprising a motor and an impeller directly connected to a motor shaft and, more particularly, to an improvement in a vortex blower of the type that includes a motor having a shaft, an impeller mounted on one end of the shaft for rotation therewith, an impeller housing defining therein a compression chamber in opposite relationship to the impeller, a bearing for the shaft, a part of the impeller housing being made from aluminium or aluminium-based alloy and including an integral portion which serves as an end wall of the motor and on which the bearing is mounted.

DESCRIPTION OF THE PRIOR ART

In the prior art vortex blower of the type in which an impeller is directly connected to a motor shaft, an impeller housing which defines therein a compression chamber in opposite relationship to the impeller is bolted to that end wall of the motor which supports a bearing which journals the output end of the motor shaft. In general, a vortex blower must be constructed and arranged such that the impeller housing which defines therein a compression chamber in opposite relationship to the impeller has a flat surface section which is closely spaced from the impeller. Because the prior art vortex blower referred to above is so designed that the impeller housing is prepared separately of and secured to the bearing-supporting end wall of the motor, there are a manufacturing torelance with which the motor end wall is worked and, in addition, a manufacturing torelance with which the impeller housing is worked. These torelances in combination affect the dimension of the small space or gap defined between the impeller and the flat surface section of the impeller housing. For this reason, it has been difficult to maintain a predetermined gas between the impeller and the impeller housing.

Japanese Patent Publication No. 40-5863 (5863/1965) discloses a vortex blower in which a part of an impeller housing is made integral with an end wall of a motor. As compared with the case where the motor end wall and the impeller housing part are prepared separately, the unitary one piece structure of the impeller housing part and the motor end wall has a reduced number of surfaces to be machined with a resultant advantage that a narrow gap of a predetermined dimension can easily be provided between the impeller and the flat surface section of the impeller housing. In addition, because the impeller housing part and the motor end wall are formed as an integral one piece structure, no bolt is needed to mechanically connect the impeller housing part and the motor end wall together, which provides an additional advantage that the structural components of the blower are reduced in number.

The vortex blower is a blower of the type that is provided with a generally annular compression chamber the annulus of which is interrupted at one point by a partition wall. Inlet and outlet are provided adjacent to the partition wall. Fluid to be transferred is induced through the inlet into the compression chamber and given a vortex motion therein by vanes of the impeller. Thereafter, the fluid is discharged from the compression chamber through the outlet thereof. The action of the impeller is effective to cause the fluid to flow repeatedly into the compression chamber for thereby building up pressure therein. Due to the friction between the fluid to be transferred, the impeller and the impeller housing, a substantial amount of heat is produced. While a part of the heat is radiated from the impeller housing into the atmosphere, another part of the heat is trapped in the compression chamber. Due to other part of the heat, the compression chamber tends to be overheated with a result that the viscosity of grease in the bearing is lowered, so that the operative life of the bearing is shortened. In addition, the impeller housing and the impeller are liable to be heated to such a high temperature that these members are thermally expanded to such an extent as to cause interference between the impeller and the flat surface section of the impeller housing with a resultant sticking.

In order to eliminate this problem, the prior art vortex blower is so designed that the impeller housing is made of a metal having a good heat radiation characteristic and a high heat conductivity, such as aluminium or aluminium-based alloy, so that the heat produced by the friction between the fluid, the impeller and the impeller housing can effectively be radiated into the atmosphere to keep the members at a lower temperature. In the afore-mentioned vortex blower in which the motor end wall and the impeller housing part are made of an integral one piece element, the element is made from aluminium or aluminium-based alloy. However, aluminium and aluminium-based alloy have poor wear-resistant properties and thus are not suited for a material which is to directly support a bearing. In the case where a bearing-supporting end wall of a motor is made from aluminium or an aluminium-based alloy, therefore, the end wall is designed such that the inner peripheral surface of an axial hole or bore of the end wall into which a bearing is to be fitted is formed of an insert which is embedded into the aluminium or aluminium-based alloy and comprises a metal having a wear-resistant property higher than those of aluminium and the aluminium-based alloy.

The unitary, one piece element is formed of a casting. The insert is first placed in place within a casting mold into which molten metal, namely, aluminium or aluminium-based alloy, is poured so that the molten metal is cast onto the insert within the mold. This casting operation is not easy to carry out and has several problems, one of which is the problem of controlling the temperatures of the casting mold and the insert. Specifically, the inner peripheral surface of the insert is designed to ultimately receive the outer peripheral surface of a bearing. Thus, it is undesirable that molten metal is cast onto the inner peripheral surface of the insert. Thus, a core is placed in intimate engagement with the inner peripheral surface of an insert placed in a casting mold to prevent the molten metal from flowing to the inner peripheral surface of the insert during a casting operation. However, because the mold and the core are pre-heated to a temperature substantially equal to the temperature of the molten metal so that the metal flows to every points in the mold. In order that a core which is so preheated may be in intimate engagement with the inner peripheral surface of the insert, the temperatures of the mold and the insert must be precisely controlled with the thermal expansion of the core being born in mind.

Another problem is concerned with mounting of the insert onto the core. It requires a time-consuming and careful attention to mount the insert in place on the core the dimension of which is precisely controlled.

The bearing-supporting motor end wall is required not only to radially support the bearing but also axially support the bearing so that the motor shaft is supported against axial displacement. Namely, because the motor shaft is directly connected with an impeller, an axial displacement of the motor shaft would result in an interference between the impeller and the flat surface section of the impeller housing which are normally spaced a small distance. In a vortex blower of the type in which the bearing-supporting motor end wall and an impeller housing part are formed of an integral, one piece element, this element is so constructed as to provide a bearing supporting section having a radially extending thrust surface to be in engagement with one end face of an outer race of the bearing and an axially extending bore for engagement with the outer peripheral surface of the bearing. An auxiliary fitting is fastened to the bearing-supporting motor end wall to provide a second thrust surface which is in engagement with the other end face of the outer bearing race. In other words, the bearing fitted into the bore in the motor end wall is axially supported by a first thrust surface provided by the end wall itself and by the second thrust surface provided by the fitting fastened to the end wall. Thus, in the case where the impeller housing part and the motor end wall are made of an integral one piece element formed of aluminium or aluminium-based alloy, the bearing-supporting structure needs the insert and the fitting in addition to the end wall of the motor.

SUMMARY OF THE INVENTION

It is an object of the present invention to provide an improved vortex blower which includes impeller housing part and motor end wall of a unitary one piece structure formed of aluminium or aluminium-based alloy but which eliminates an insert of a different metal and which can be formed of a reduced number of components.

It is another object of the present invention to provide an improved vortex blower of the class specified above and which is so designed that the structural components can easily be assembled.

According to the present invention, there is provided an improved vortex blower including a motor having a shaft, an impeller mounted on one end of the shaft for rotation therewith, an impeller housing defining therein a compression chamber in opposite relationship to the impeller, a bearing for the shaft, a part of the impeller housing being made from one of aluminium and aluminium-based alloy and including an integral portion which serves as an end wall of the motor and on which the bearing is mounted, the bearing being of the type that includes inner and outer races, the improvement which comprises: a first thrust surface provided on the end wall and being in engagement with one of the end faces of the outer race of the bearing; a bearing retainer of a metal having a wear-resistant property higher than that of the metal from which the part of the impeller housing is made, said bearing retainer having an axially extending surface in engagement with the outer peripheral surface of the outer bearing race and a second thrust surface in engagement with the other end face of the outer bearing race; and means for mounting the bearing retainer and the bearing on the end wall.

The improvement according to the present invention, as pointed out above, assures that the part of the impeller housing which is integral with the bearing-supporting wall of the motor and which is made of aluminium or aluminium-based alloy is required to provide only one surface portion to be in direct engagement with the bearing. This surface portion is not a surface which radially supports the bearing but is a thrust surface which supports the bearing in an axial direction. The improved end wall structure in combination with the bearing retainer eliminates the requirement for an insertion, which assures a simplified casting operation wherein the casting mold may simply be preheated to a temperature at which molten aluminium or an aluminium-based alloy can smoothly flow in the mold. Thus, control of the mold temperature can be made easier as compared with the prior art. The manufacture of the one piece element eliminates the troublesome mounting of an insert in a mold and thus can be greatly simplified as compared with the manufacture of the one piece element used in the prior art. The one piece element which was used in the prior art needed an insert and an auxiliary fitting, but the one piece element of the structure according to the present invention merely requires a bearing retainer only. Thus, the invention reduces the number of structural components of the blower.

Preferably, the first thrust surface may be in engagement with that end face of the outer bearing race which is adjacent to the impeller and the second thrust surface may be in engagement with that end face of the outer bearing race which is remote from the impeller. This preferred arrangement assures a simplified steps of manufacture of the blower; namely, a rotor assembly including a motor shaft, a rotor and bearings mounted on the shaft may be introduced into a stator assembly including a stator secured to a motor casing and an end wall remote from the impeller and, thereafter, the unitary one piece structure including the other end of the motor and a part of the impeller housing may be assembled with the stator and rotor assemblies to complete the motor unit of the blower. The impeller and the rest of the impeller housing may then be assembled with the motor unit thus obtained.

The above and other objects, features and advantages of the invention will be made more apparent by the following description with reference to the accompanying drawings.

DESCRIPTION OF A PREFERRED EMBODIMENT

Figure 1:
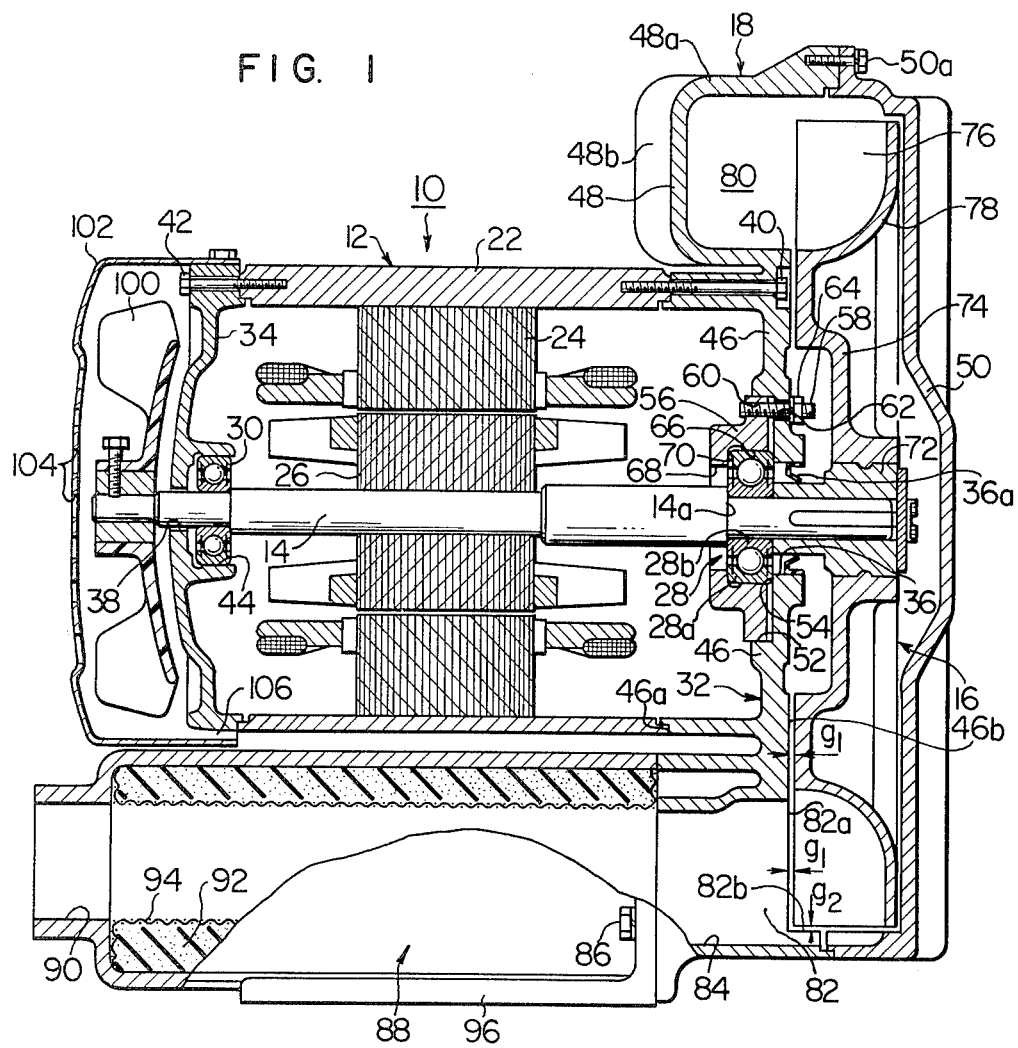
FIG. 1 is a partially sectional side view of an embodiment of a vortex blower according to the present invention.

Referring first to FIG. 1, a vortex blower generally designated by 10 comprises a motor 12 including a motor shaft 14; an impeller 16 mounted on one end of the motor shaft 14 for rotation therewith; and an impeller housing 18.

The motor 12 comprises a generally cylindrical casing 22 which supports a stator 24 secured to the inner peripheral surface of the casing. The motor shaft 14 supports a rotor 26 disposed inside the stator 24 and mounted on the shaft 14 for rotation therewith. The shaft 14 is rotatably supported by first and second bearings 28 and 30 mounted on first and second end wall members 32 and 34, respectively, and has opposite end portions extending axially outwardly from the end wall members 32 and 34 through openings 36 and 38 formed therein substantially centrally thereof, respectively. The first end wall member 32 is secured to a first end of the motor casing 22 by means of bolts only one of which is shown by 40. The second end wall member 34 is secured to the other or second end of the motor casing 22 by means of bolts only one of which is shown by 42.

The impeller 16 is mounted on that end of the motor shaft 14 which extends out of the first end wall member 32 and is housed in the impeller housing 18, as will be discussed in more detail later. The second end wall member 34, through which the other end portion of the motor shaft 14 extends, is formed therein with a circular recess y4 which is coaxial with the opening 38. The second bearing 30 is press-fitted into the recess 44.

The end wall member 32 comprises a first or radially inner generally annular portion 46 and a second or radially outer generally annular portion 48 extending from and integrally connected to the annular inner portion 46. The portion 46 is generally cup-shaped with its annular end face 46a in abutment engagement with the first end of the motor casing 22 so that the annular inner portion 46 acts as the first end wall of the motor 12. The second or radially outer annular portion 48 cooperates with a generally circular lid or closure member 50 to form the impeller housing 18. The end wall member 32, therefore, may be defined as a "united motor end wall and impeller housing member". For the simplification purpose, however, the member 32 will be called herein "end wall member". The end wall member 32 may preferably be made from a material which has a good heat radiation characteristic and a high heat conductivity, such as aluminium or an aluminium-based alloy to facilitate a good radiation of heat produced in the impeller housing 18. In the illustrated embodiment of the invention, the end wall member 32 is made from an aluminium-based alloy which comprises from 83.7 to 88.5% by weight of aluminium, from 1.5 to 3.5% by weight of copper, from 9.6 to 12.0% by weight of silicon, from 0.3 to 0.6% by weight of iron and less than 0.15% by weight of balance comprising magnesium, zinc, manganese, nickel and tin.

In the axially inner surface of the end wall member 32 is formed a generally annular recess defined by a substantially cylindrical surface 52 coaxial with the axial opening 36 and a flat annular bottom surface 54 in which the opening 36 is formed centrally thereof. The first bearing 28 is mounted by an annular bearing retainer 56 on the end wall member 32 so that one end face of an outer race 28a of the bearing 28 is in abutment engagement with the bottom surface 54 of the annular recess 52. More specifically, the bearing retainer 56 is so shaped as to be snugly received in the annular recess 52 and is mounted in position on the end wall member 32 by means of a plurality of circumferentially spaced screw rods only one of which is shown by 58 and screwed at one end into a threaded hole 60 formed in the bearing retainer 56. The other or second end of the screw rod 58 extends axially outwardly through a hole 62 formed in the end wall member 32 in alignment with the threaded hole 60 in the bearing retainer 56. A nut 64 is screwed over the second end of the screw rod 58 to tighten the screw rod.

The bearing retainer 56 is generally dish-shaped and is faced to the bottom surface 54 of the recess 52 formed in the end wall member 32. A central axial bore or hole is formed in the bottom part of the bearing retainer 56. This hole is defined by first and second cylindrical surfaces 66 and 68 of different diameters and a radially extending intermediate annular surface 70 disposed therebetween. The first cylindrical surface 66 is disposed adjacent to the end wall member 32 and is of the inner diameter which snugly receives the outer cylindrical surface of the outer race 28a of the first bearing 28. The second cylindrical surface 68 is axially remote from the end wall member 32 and is radially outwardly spaced from the peripheral surface of the motor shaft 14. The arrangement is such that, when the bearing retainer 56 with the bearing 28 therein is fitted into the recess 52 in the end wall member 32 and is urged toward the bottom surface 54 of the recess 52 by tightening the screw rods 58, the surface 54 is engaged by the axially outer end face of the outer bearing race 28a. Simultaneously, the radially extending annular surface 70 in the bearing retainer 56 is engaged with the axially inner end face of the outer bearing race 28a. Thus, these surfaces 54 and 70 act as first and second thrust surfaces. As the axially inner end face of an inner race 28b of the bearing 28 is in abutment engagement with an axially outwardly directed shoulder 14a formed on the motor shaft 14, the first thrust surface 54 is operative to bear the motor shaft 14 against rightward movement as viewed in FIG. 1.

The bearing retainer 56 is preferably made of a metal having a wear-resistant property higher than that of the material from which the end wall member 32 is made. In the illustrated embodiment of the invention, the bearing retainer 56 is fabricated from gray cast iron comprising from 91.1 to 94.7% by weigh of iron, from 2.0 to 4.0% by weight of carbon, 3.0% by weight of silicon, from 0.3 to 1.0% by weight of manganese and from 0.04 to 0.93% by weight of balance comprising phosphorus and sulphur.

The impeller 16 is rigidly mounted on the motor shaft 14 for rotation therewith by means of a hub 72 and comprises a substantially annular central section or disc 74 firmly secured to the hub 72, a series of vanes 76 extending radially outwardly from the radially outer peripheral zone of the disc 74 and circumferentially equally spaced from each other, and a support section 78 connected to the radially inner ends and axially outer sides of respective vanes 76 to connect them to the disc 74. The disc 74, the series of vanes 76 and the support section 78 are all integral with each other and made by casting. The impeller material is cast onto the hub 72. The hub 72 has an axially inner end which is in engagement with the axially outer end face of the inner race 28b of the first bearing 28 to axially position the impeller 16 such that the disc 74 of the impeller is axially closely spaced a gap $g_1$ from an axially outer flat surface 46b of the radially inner annular portion 46 of the end wall member 32. An annular dust seal 36a is provided between the inner surface of the opening 36 in the end wall member 32 and the outer peripheral surface of the hub 72.

The radially outer annular portion 48 of the end wall member 32, which forms a part of the impeller housing 18 as discussed previously, is so shaped as to define a generally annular recess which is coaxial with the motor shaft 14 and is directed to the vanes 76 of the impeller 16. The radially outer annular portion 48 has a generally cylindrical outer peripheral wall 48a which has an annular end face in face-to-face engagement with the closure member 50 and is secured thereto by means of bolts one of which is shown by 50a. A plurality of cooling fins 48b are provided on and extend from the radially outer annular portion 48 of the end wall member 32. This portion 48 cooperates with the series of vanes 76 and the closure member 50 to define a compression chamber 80 which is generally annular. Stated strictly, however, the compression chamber 80 is not completely "annular" because a radially and axially extending partition wall 82 is provided to circumferentially interrupt or "split" the annulus of the compression chamber 80. The compression chamber 80 is provided with inlet 84 and an outlet (not shown) which are separated by the partition wall 82. The outlet is provided behind the partition wall 82. The partition wall 82 and the vanes 76 are shaped and dimensioned such that the axially outer end 82a of the partition wall 82 is axially closely spaced a distance $g_1$ from the axially inner ends of the vanes 76 and such that the partition wall 82 has a radially inwardly directed surface portion 82b which is radially closely spaced a distance $g_2$ from the radially outer ends of the vanes 76.

The inlet 84 is connected by bolts (one of which is shown by 86) to a silencer 88 which extends generally parallel to the motor shaft 14 and has an intake port 90. The silencer 88 is provided with an inner lining 92 of a noise absorption material, such as cotton fiber or sponge rubber, which is secured to the inner surface of the silencer by means of a net 94. The outlet (not shown) of the compression chamber 80 is also connected to a similar silencer (not shown). These silencers (one of which is shown by 88) are provided with a base 96.

To the end of the motor shaft 14 which extends out of the second end wall member 34, is mounted a cooling fan 100 for rotation with the motor shaft and is disposed in a chamber defined in a generally cup-shaped protective cover member 102 which is secured at one end to the outer peripheral surface of the end wall member 34. The cover member 102 is provided with a plurality of air intake holes or apertures 104 and, in addition, cooperates with the outer peripheral surface of the end wall member 34 to define therebetween a plurality of circumferentially spaced arcuate air discharge slits only one of which is shown at 106. These slits 106 are arranged around the motor casing 22 and directed toward the impeller housing 18 so that, when the motor 12 is energized, the cooling fan 100 is rotated to induce streams of cooling air flowing through the slits 106, along the outer peripheral surface of the motor casing 22 and along the cooling fins 48b on the impeller housing 18.

In order to facilitate a high rate of heat radiation from the impeller housing 18, it is preferred that the impeller 16 and the closure member 50 are also made from a material having a good heat radiation characteristic and a high heat conductivity, such as aluminium or aluminium-based alloy. In the illustrated embodiment of the invention, the impeller 16 and the closure member 50 are made of an aluminium-based alloy similar to that from which the end wall member 32 is made.

In operation, when the motor 12 is energized to drive the impeller 16, the fluid to be transferred flows through the intake port 90 into the silencer 88 from which the fluid flows through the inlet 84 into the compression chamber 80 in which the fluid is given a vortex motion by the vanes 76 of the impeller 16 and flows in the chamber 80 toward the outlet (not shown).

Due to the action of the impeller 16, the fluid repeatedly swirls into the pressure chamber 80 with resultant pressure build-up therein. When the fluid reaches the outlet of the pressure chamber 80 at an elevated pressure, the fluid flows therefrom through the outlet.

The described structure and arrangement of the end wall member 32 and the bearing retainer 56 assure that the end wall member 32 can have only one surface portion 54 in engagement with the bearing 28. As discussed previously, the surface portion 54 of the end wall member 32 is not a cylindrical surface portion to receive the bearing therein, but is a thrust surface portion which is operative to bear the bearing against axial movement thereof. This surface portion 54, therefore, does not need any reinforcement such as a metal insert which was required in the prior art arrangement. For this reason, the end wall member 32 as a whole can simply and conveniently be made from aluminium or an aluminium-based alloy. More specifically, it will be sufficient that a casting mold which is used to cast the end wall member 32 is pre-heated to a temperature at which molten aluminium or aluminium-based alloy can smoothly be poured into the mold. The control of mold temperature is thus made easier than in the prior art. In addition, because the manufacture of the end wall member 32 does not need an insert onto which molten metal is to be cast, the production of the end wall member 32 is free from the troublesome process step of mounting an insert into a casting mold and, thus, is simplified, accordingly. Moreover, the bearing retainer 56 is of a unitary structure which provides the cylindrical surface 66, into which the bearing 28 is fitted, and the second thrust surface 70. Thus, the bearing retainer serves as both the insert and the auxiliary fitting which were employed in the prior art. The described structure and arrangement, therefore, advantageously reduce the number of components required to mount the bearing 28 on the end wall of the motor.

The fact that the end wall member 32 is of a unitary structure can assure that the member 32 is required to be machined only at the flat end face 46b faced to the impeller 16, the bottom surface 54 of the recess 52 and the annular end face 46a in abutment engagement with the motor casing 22 and, therefore, the gaps $g_1$ and $g_2$ defined between the end wall member 32 and the impeller 16 are of predetermined small dimensions.

Figure 2:
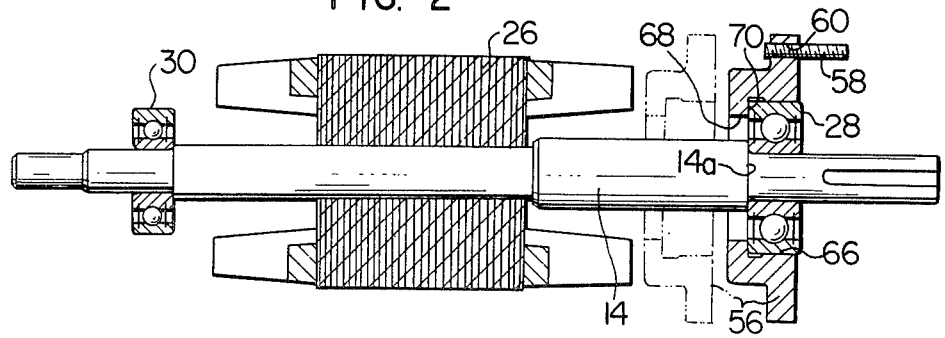
FIG. 2 is a partially sectional side view of a rotor assembly of a motor shown in FIG. 1 with bearings and a bearing retainer mounted on a motor shaft which forms a part of the rotor assembly.

In the embodiment of the invention described above, the annular recess 52 is formed in the axially inner surface of the end wall member 32 and the bearing retainer 56 is fitted into the recess 52 so that the retainer is directed outwardly. The annular recess 52, however, may alternatively be formed in the axially outer surface of the end wall member 32. However, the structure of the end wall member 32 employed in the described and illustrated embodiment of the invention is more advisable in the view point of the assembly of components. More specifically, the components of the vortex blower of the described and illustrated embodiment of the invention are assembled as follows:

The rotor 26 is secured to the shaft 14 first. The bearing 30 is then secured to the shaft 14. The bearing retainer 56 is then received on the shaft 14, as shown by broken lines in FIG. 2. Then the bearing 28 is secured to the shaft 14. The two bearings and the rotor are fixed to the motor shaft 14 usually by shrinkage fitting. Then the bearing retainer 56 is axially moved from the broken line position to the solid line position shown in FIG. 2. At this time, at least one screw rod 58 is screwed into a threaded hole 60 formed in the bearing retainer 56, as shown in FIG. 2. This step of assembly is advantageous for a reason to be made apparent later. A rotor assembly thus obtained will then be inserted into a stator assembly which comprises the stator 24 and the end wall member 34 already secured to the motor casing 22. The rotor assembly will be introduced into the stator assembly with the bearing 30 forward until the end of the motor shaft 14 adjacent to the bearing 30 is inserted into the opening 38 in the end wall member 34 and the bearing 30 is fitted into the recess 44. Then, the end wall member 32 will be moved to the first end of the motor casing 22 and centered relative to the bearing retainer 56. At this time, the screw rod 58 which has been previously screwed into the screw hole 60 in the bearing retainer 56 is first inserted into the corresponding aperture 62 in the end wall member 32 to serve as a guide for the end wall member 32; namely, the member 32 will be guided by the screw rod 58 to a predetermined position with respect to the bearing retainer 56 and the motor casing 22. The end wall member 32 is then secured to the motor casing 22 by the bolts 40. A nut 64 is screwed over the screw rod 58 which extends through the aperture 62 in the end wall member 32. Other screw rods will then be screwed into the rest of the screw holes and apertures which have previously been formed in the bearing retainer 56 and the end wall member 32 and which are now aligned with each other. All the screw rods 58 are tightened by nuts 64 to urge the bearing retainer 56 toward the end wall member 32 so that the opposite ends of the outer race 28a of the bearing 28 are firmly engaged by the annular surfaces 54 and 70 (first and second thrust surfaces) of the end wall member 32 and the bearing retainer 56. At this stage of the assembly, the first end portion of the motor shaft 14 extends outwardly from the end wall member 32 through the opening 36. The dust seal 36a will then be fitted into the opening 36. The impeller 16 will then be mounted on the motor shaft 14. The closure member 50 and the silencer unit 88 will be connected to the end wall member 32 by the bolts 50a and 86, respectively. The cooling fan 100 will then be mounted on the second end of the motor shaft 14. Finally, the protective cover member 102 will be mounted on the motor casing 22 to complete the assembly.

If the end wall member 32 and the bearing retainer 56 were arranged such that the bearing retainer 56 is disposed on the side of the end wall member 32 adjacent to the impeller 16, the assembling operation must be carried out such that the end wall member 32 is received on the motor shaft 14 and thereafter the bearing 28 is received on and secured to the motor shaft 14. Because the end wall member 32 is not fixed to the shaft 14 at this stage of assembly and thus is freely movable relative to the shaft 14, the end wall member 32 on the shaft 14 interferes with the step of introducing the rotor assembly into the stator assembly. It will therefore be appreciated that the described and illustrated arrangement of the end wall member 32 and the bearing retainer 56 is preferred from the view point of easy and simplified assembly of structural components of the blower.

What is claimed is:

1. In a vortex blower including a motor having a shaft, an impeller mounted on one end of said shaft for rotation therewith, an impeller housing defining therein a compression chamber in opposite relationship to said impeller, a bearing for said shaft, a part of said impeller housing being made from one of aluminium and aluminium-based alloy and including an integral portion which serves as an end wall of said motor and on which said bearing is mounted, said bearing being of the type that includes inner and outer races, the improvement which comprises:

a first thrust surface provided on said end wall and being in engagement with one of the end faces of said outer race of said bearing;

a bearing retainer of a metal having a wear-resistant property higher than that of the metal from which said part of said impeller housing is made, said bearing retainer having an axially extending surface in engagement with the outer peripheral surface of said outer bearing race and a second thrust surface in engagement with the other end face of said outer bearing race; and means for mounting said bearing retainer and said bearing on said end wall.

2. A blower as defined in claim 1, wherein said first thrust surface is in engagement with that end face of said outer bearing race which is adjacent to said impeller and said second thrust surface is in engagement with that end face of said outer bearing race which is remote from said impeller.

3. A blower as defined in claim 1 or 2, wherein said part of said housing is made of an aluminium-based alloy comprising from 83.7 to 88.5% by weight of aluminium, from 1.5 to 3.5% by weight of copper, from 9.6 to 12.0% by weight of silicon, from 0.3 to 0.6% by weight of iron and less than 0.15% by weight of balance comprising magnesium, zinc, manganese, nickel and tin and wherein said bearing retainer is made of a gray cast iron comprising from 91.1 to 94.7% by weight of iron, from 2.0 to 4.0% by weight of carbon, 3.0% by weight of silicon, from 0.3 to 1.0% by weight of manganese and from 0.04 to 0.93% by weight of balance comprising phosphorus and sulphur.

4. A blower as defined in claim 2, wherein the end of said motor shaft to which said impeller is fixed extends from said end wall through an opening formed therein and wherein said end wall is provided with a recess formed in the axially inner surface thereof, said recess having an axially extending inner peripheral surface and a radially extending substantially flat bottom surface in which said opening is formed, said bottom surface providing said first thrust surface and being in engagement with said one end face of said outer bearing race, said bearing retainer being substantially snugly received in said recess and provided with a second opening through which said motor shaft extends, said second opening being substantially coaxial with the first-said axially extending surface and having an inner diameter smaller than that of the first-said axially extending surface to provide therebetween a radially extending annular surface providing said second thrust surface and being in engagement with the other end face of said outer bearing race.

* * * * *